United States Patent [19]

Chapman et al.

[11] Patent Number: 4,953,422

[45] Date of Patent: Sep. 4, 1990

[54] COMPOUND ANGLE LIMITING DEVICE

[75] Inventors: William L. Chapman; Charles F. Marner; Daniel K. Schotter, all of Tucson, Ariz.; Ronald L. Hehn, Euless, Tex.

[73] Assignee: Hughes Aircraft Company, Los Angeles, Calif.

[21] Appl. No.: 174,055

[22] Filed: Mar. 28, 1988

[51] Int. Cl.[5] ........................ G05G 5/04; F16M 11/12; H01Q 3/08

[52] U.S. Cl. ........................................ 74/526; 74/479; 248/184; 248/661; 343/882

[58] Field of Search .................. 74/479, 526; 248/184, 248/487, 661; 343/882, 766

[56] References Cited

U.S. PATENT DOCUMENTS

| | | | |
|---|---|---|---|
| 3,527,435 | 9/1970 | Lapp et al. | 343/882 X |
| 3,662,610 | 5/1972 | Thoen | 74/526 X |
| 4,256,279 | 3/1981 | Duel | 248/184 |
| 4,490,724 | 12/1984 | Bickman | 343/766 |
| 4,580,461 | 4/1986 | Sears et al. | 74/479 |
| 4,621,899 | 11/1986 | Hoult et al. | 248/487 X |

FOREIGN PATENT DOCUMENTS

| | | | |
|---|---|---|---|
| 55-92001 | 7/1980 | Japan | 343/882 |

*Primary Examiner*—Allan D. Herrmann
*Attorney, Agent, or Firm*—M. W. Sales; R. A. Hays; W. Denson-Low

[57] ABSTRACT

A compound angle limiting device is disclosed herein. The invention provides for control of the angular excursion of a pivotal mass within first and second angles about first and second axes without the necessity for external stops. The invention includes a first coupling mechanism for sensing movement of the mass about the first axis, a second coupling mechanism for sensing movement of the mass about the second axis; a first cam coupled to the mass via the first coupling mechanism and movable in response thereto; and a second cam coupled to the mass via the second coupling mechanism and movable in response thereto. The first and second cams are mounted for physical contact at at least one point to limit the compound angular excursion of the mass via the first and second coupling mechanisms.

19 Claims, 5 Drawing Sheets

FIG. 4
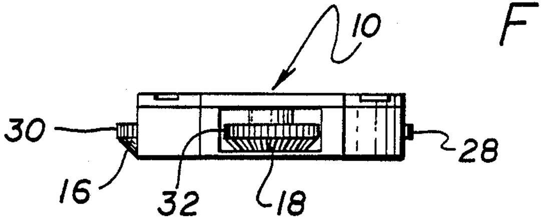
FIG. 5(a)
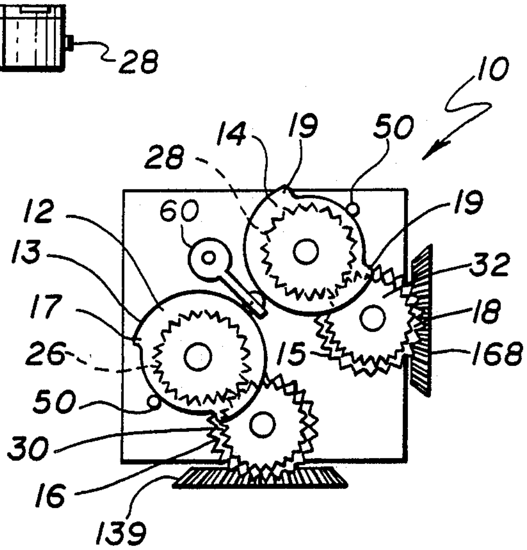
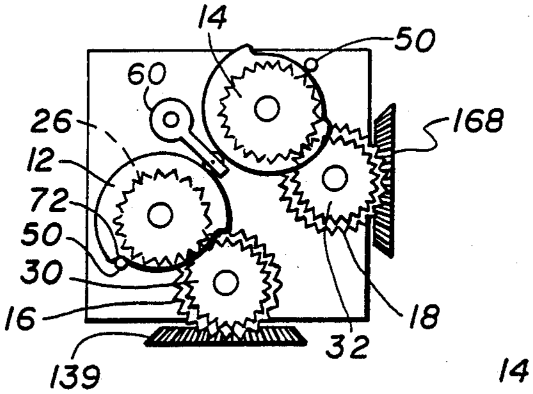
FIG. 5(b)
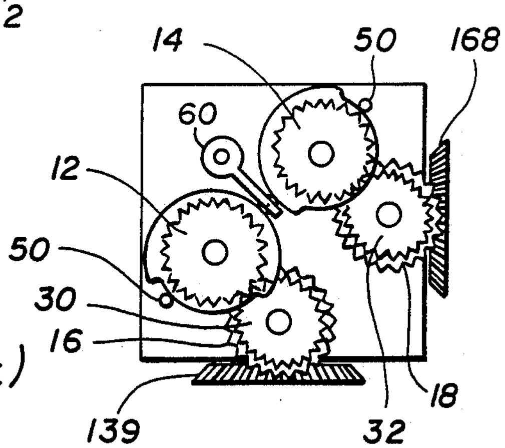
FIG. 5(c)

COMPOUND ANGLE LIMITING DEVICE

BACKGROUND OF THE INVENTION

1. Field of the Invention:

The present invention relates to mechanical gearing apparatus. More specifically, the present invention relates to apparatus which limit the excursion of a pivoted mass to a prescribed angle.

While the present invention is described herein with reference to an illustrative embodiment for a particular application, it will be understood that the invention is not limited thereto. Those of ordinary skill in the art, having access to the teachings provided herein, will recognize additional modifications, applications, and embodiments within the scope of the invention.

2. Description of the Related Art:

Antenna pointing systems are exemplary of the many applications in which it is desirable to control the angular excursion of a pivoted mass. Where the antenna must operate in close quarters, there is a requirement that the compound angular excursions of the antenna be mechanically limited to prevent impact damage to the system.

Common methods for limiting compound angles include peripheral bumper rings and like methods of direct contact between the device being positioned and the adjacent support structure. This typically imposes significant weight and cost penalties on the system.

For example, one approach provides for a bumper ring on the antenna adapted to engage an associated stop ring attached to the frame. To avoid significant performance degradations in the pointing of the antenna, the weight of the bumper ring must be minimized. This typically requires an elaborate and expensive manufacturing process by which unnecessary mass is removed from the ring while retaining stiffness.

In addition, the ring mass imposes significant mass requirements on the antenna. That is, the antenna must be sufficiently strong to carry the weight of the ring and to handle the associated dynamic mass moments of inertia. This militates against the use of other more lightweight antenna designs which in turn forces the use of heavier bumper rings and etc..

There is therefore a need in the art for an alternative means for controlling the compound angular excursion of pivoted masses which limits the additional supportive weight and mass moment of inertia requirements on the system.

SUMMARY OF INVENTION

The need in the art is addressed by the compound angle limiting device of the present invention. The invention provides for control of the angular excursion of a pivotal mass within first and second angles about first and second axes without the necessity for external stops. The invention includes a first coupling mechanism for sensing movement of the mass about the first axis, a second coupling mechanism for sensing movement of the mass about the second axis; a first cam coupled to the mass via the first coupling mechanism and movable in response thereto; and a second cam coupled to the mass via the second coupling mechanism and movable in response thereto. The first and second cams are mounted for physical contact at at least one point to limit the compound angular excursion of the mass via the first and second coupling mechanisms.

BRIEF DESCRIPTION OF THE DRAWINGS

FIG. 3(*b*) shows a perspective view of the cover of the compound angle limiting device of FIG. 3(*a*).

FIG. 4 side elevational view of the compound angle limiting device of the present invention.

FIGS. 5(*a*) through 5(*c*) show schematic views of the device 10 with various combinations of azimuthal and elevational input angles within the illustrative combined compound angle of 60 degrees.

DESCRIPTION OF THE INVENTION

Figure 1:
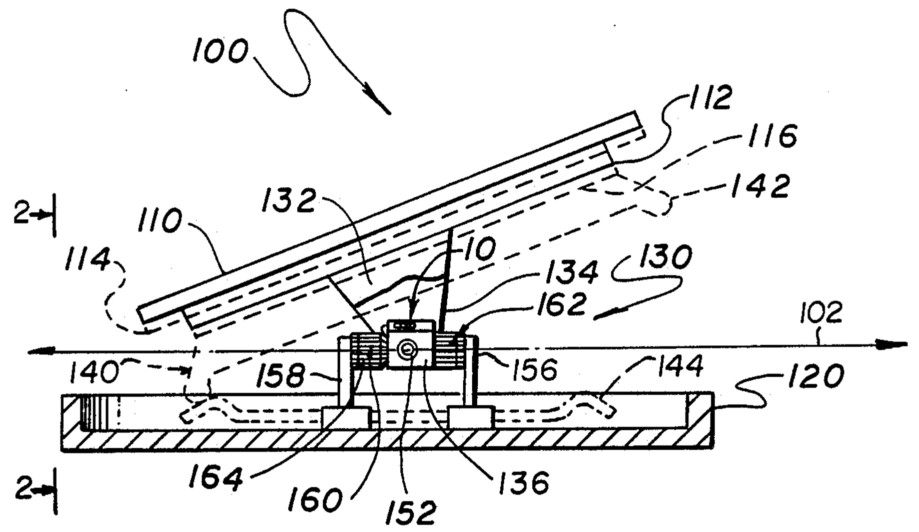
FIG. 1 shows the ccmpound angle limiting device 10 of the present invention in the illustrative environment of an antenna system.

FIG. 1 shows the compound angle limiting device 10 of the present invention in the illustrative environment of an antenna system 100. The antenna 110 provides a mass which is pivotally attached to a frame or bulkhead 120 through a support mechanism 130. The support mechanism 130 provides, pivotal support with two degrees of freedom through a gimballed compound angle antenna 110 is thus moved about a first axis 102 and a second axis 104 (see FIG. 2). The support mechanism 130 controls the angular excursions of the antenna 110 so that it covers a field of view defined by maximum azimuth and elevational angles in a manner well known in the art.

A conventional mechanism 140 for controlling the angular excursions of the antenna 110 is shown in phantom. The conventional mechanism 140 included an annular bumper ring 142 attached to the rear surface of the antenna 110 (typically at the sum and difference network 112) which engaged an annular stop ring 144 attached to a bulkhead whenever the antenna 110 underwent an angular excursion outside the maximum look angle. The bumper ring 142 added to the weight and inertia of the pivotally mounted antenna 110 and thereby added structural design constraints to the antenna 110. This precluded the use of thin foil and other lightweight antenna designs.

With the teaching of the present invention, the mechanism 140 of the prior art may be eliminated and the antenna system 100 constructed taking advantage of more lightweight design principles. The phantom lines 114 and 116 in FIG. 1 illustrate the size reduction in the antenna 110 and the associated sum and difference network 112 made possible by the present invention.

Figure 2:
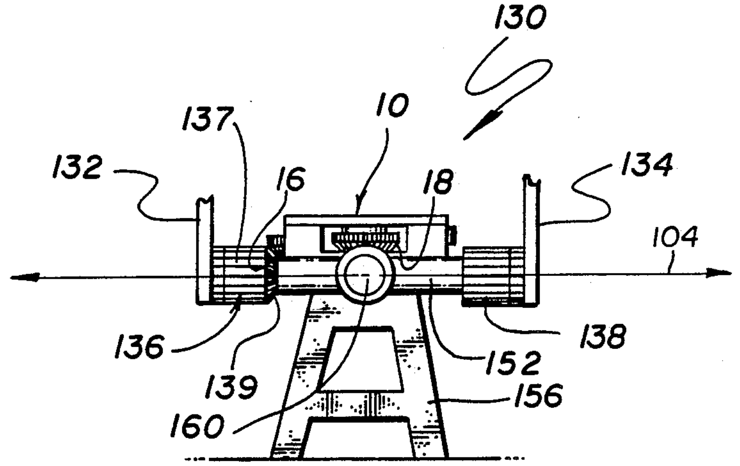
FIG. 2 shows a partial side view of an antenna support with the compound angle limiting device of the present invention.

Thus, the support mechanism 130 includes first and second arms 132 and 134 which are attached to the sum and difference network 112 on one end. The first arm 132 is shown fragmented in FIG. 1 to reveal the coaxial motor 136 as shown in FIG. 2. The first arm 132 is attached, at its other end, to one side of the rotor 137 of the motor 136. At the other end of the rotor 137 is a beveled gear 139 which engages a beveled gear 16 of the compound angle limiting device 10 of the present invention. As discussed more fully below, the compound angle limiting device 10 provides an internal gimbal stop through cams which variably limit the angular excursions of the antenna 110.

Figure 3B:
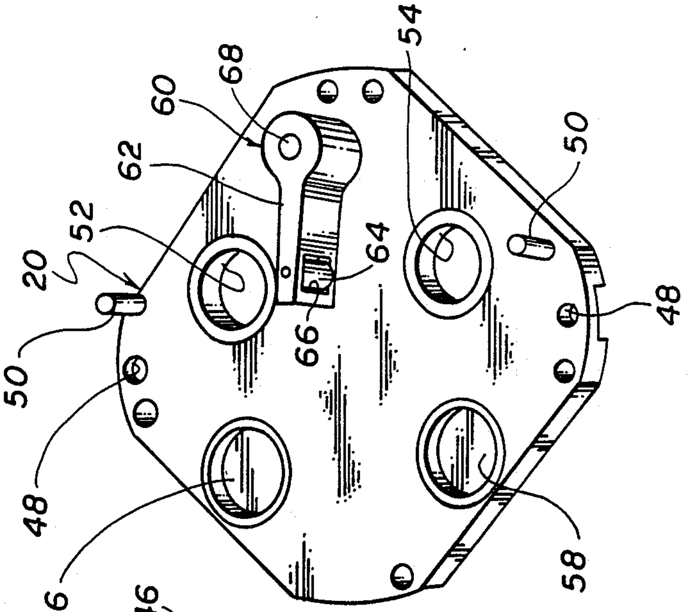
FIG. 3(*a*) shows a perspective view of the compound angle limiting device of the present invention with the cover removed.
Figure 3A:
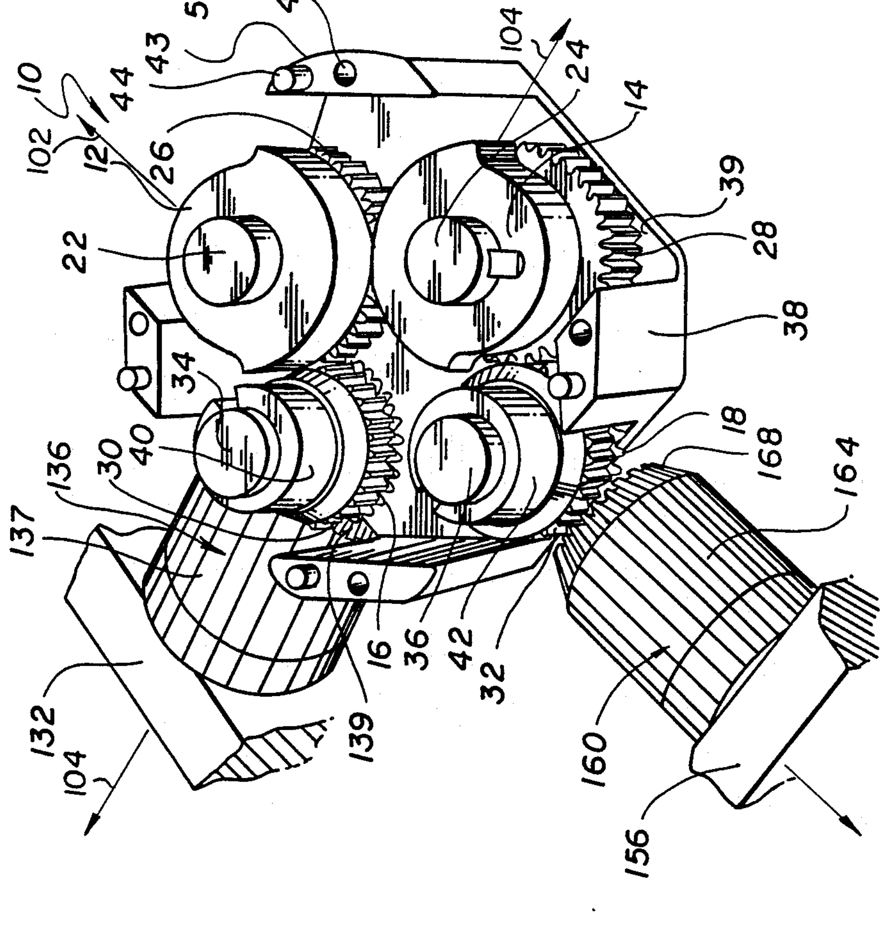

As shown in the partial side view of FIG. 2 with the second pedestal 158 removed, the second arm 134 is attached or mechanically linked to a coaxial resolver 138. The resolver 138 is mechanically parallel and diametrically opposed to the motor 136 on a first shaft 152. The compound angle limiting device 10 rests on the first shaft 152 which in turn is integral with and transverse to a second shaft 154 (not shown). The second shaft 154 is pivotally attached to the first and second pedestals 156 and 158 via a second motor 160 and an associated resolver 162. As is known in the art, the resolvers 138 and 162 provide an electrical output signal indicative of the angular position of the device to which it is attached. The pedestals 156 and 158 are attached to the bulkhead 120. See FIGS. 1 and 2. The coaxial stator (not shown) of the motor 160 is attached to the pedestal 156 while the rotor 164 is linked through a bevel gear 168 to a second bevel gear 18 on the compound angle limiting device 10 of the present invention. See the perspective view of the compound angle limiting device 10 of the present invention with the motors 136 and 160 as shown in FIG. 3.

Before discussing the design and operation of the compound angle limiting device of the present invention, it should be noted that since the present invention permits the antenna 110 and associated sum and difference network 112 to be of lighter construction, the antenna drive mechanism may also be reduced. That is, where two motors may have been required with conventional design, the present invention, by allowing a lighter antenna construction, may allow for ample drive to be provided with one motor per axis cf rotation.

This, in turn, may permit the elimination of heavy offset resolvers typically associated with conventional scanning platform antenna systems. That is, if only one motor is required per axis, the resolver may be coaxially mounted on the shaft on which the motor is mounted. An additional advantage derives from the improved performance offered by coaxial resolvers.

Nonetheless, it should be understood that although the antenna system 100 is shown with the advantageous lightweight construction afforded by the present invention, the invention is not limited thereto. Further, any device providing an output proportional to angle may be used, e.g. resolver, encoder, potentiometer, etc.

FIG. 3(*a*) provides a perspective view of the compound angle limiting device 10 of the present invention. The cover plate 20 is shown separately in FIG. 3(*b*). The invention includes first and second cams 12 and 14 which serve to limit the excursions of the antenna 110 about axes 102 and 104 within a compound angle as discussed more fully below. The first and second cams 12 and 14 rotate about shafts 22 and 24, to which they are keyed, respectively. The cams 12 and 14 rest on first and second spur gears 26 and 28 respectively. The spur gears 26 and 28 are also keyed to the first and second shafts 22 and 24. Third and fourth spur gears 30 and 32 are keyed to third and fourth shafts 34 and 36 along with bevel gears 16 and 18 respectively. Spacers 40 and 42 top the third and fourth spur gears 30 and 32 respectively. The first and second spurs gears 26 and 28 cooperate with the third and fourth spur gears 30 and 32 to provide translation of the input angle from the first and second bevel gears 16 and 18 to the first and second cams 12 and 14 respectively. It should be noted, however, that the invention may be realized without the translation gears where space permits. In fact, it is conceivable that the input angles may be provided to the cams 12 and 14 directly in a manner known to those skilled in the art without departing from the scope of the invention.

The cams and gears are mounted within a housing 38 which includes a bottom plate 39 and four staunch posts 43. The posts are equipped with pins 44 which mate with corresponding holes 48 in the cover plate 20. (See FIG. 3(*b*).) The shafts 22, 24, 34, and 36 are adapted to seat in bushed bores 52, 54, 56 and 58 respectively in the cover plate 20. Thus, the cams 12 and 14 are free to rotate in response to the rotation of the bevel gears until they engage each other in abutting relation or until the engage cam stops 50. The cam stops provide a limit on the angular excursion of the antenna 110 when it travels in azimuth or elevation exclusively so that input is received by one cam only.

The cover plate assembly also includes a cam follower 60. The cam follower 60 includes an arm 62 pivotally mounted on a pin or shaft 68. The arm includes a slot 66 within which a bearing 64 rotates. The arm pivots in response to the cams 12 and 14 and has a destabilizing effect thereon. That is, the cam follower 60 prevents the cams from locking together. Other mechanism and techniques may be used to perform this function without departing from the scope of the invention.

A side elevational view of the invention 10, fully assembled, is shown in FIG. 4.

To illustrate the advantageous operation of the present invention, FIGS. 5(*a*) through 5(*c*) show schematic views of the device 10 with various combinations of azimuthal and elevational input angles within the illustrative combined compound angle of 60 degrees. Thus, FIG. 5(*a*) shows the arrangement of the cams 12 and 14 for a look angle 'c' of 0 degrees. In FIG. 5(*a*), the elevation angle 'a' is 0 degrees and the aximuth angle 'b' is 0 degrees. In FIG. 5(*b*), the elevation angle ,a, is 60 degrees and the azimuth angle is 0 degrees. The resulting compound angle is the maximum angle of 60 degrees. The 60 input elevational angle is translated to the first cam 12 through the bevel gear 16, the third spur gear 30 and the first spur gear 26, to the first cam 12. Thus, the first cam 12 is fully rotated in the positive direction. In this position, the first cam engages the second cam 14 through direct face contact or mechanical coupling. Limiting is assured by the contact of an edge 72 of the cam 12 with a cam stop 50. FIG. 5(*c*) shows the relative positions of the first and second cams 12 and 14 in response to input elevation and azimuth angles of 45. Since the compound angle (the pointing or look angle of the antenna 110) ,c, is equal to the arccos (cos(a)-cos(b)), the compound angle is the maximum angle of 60 degrees and the cams engage to limit further movement of the antenna 110 in a positive angular direction.

As is most evident in the schematic views of FIG. 5(*a*), (b), and (c), each cam 12 and 14 has a contact surface 13 and 15 respectively with a profile determined in the manner described below and a pair of extensions 17 for the first cam 12 and 19 for the second cam 14. The extensions engage the cam stops 50 when the cams reach the maximum desired excursion to provide additional limiting action.

Figure 6:
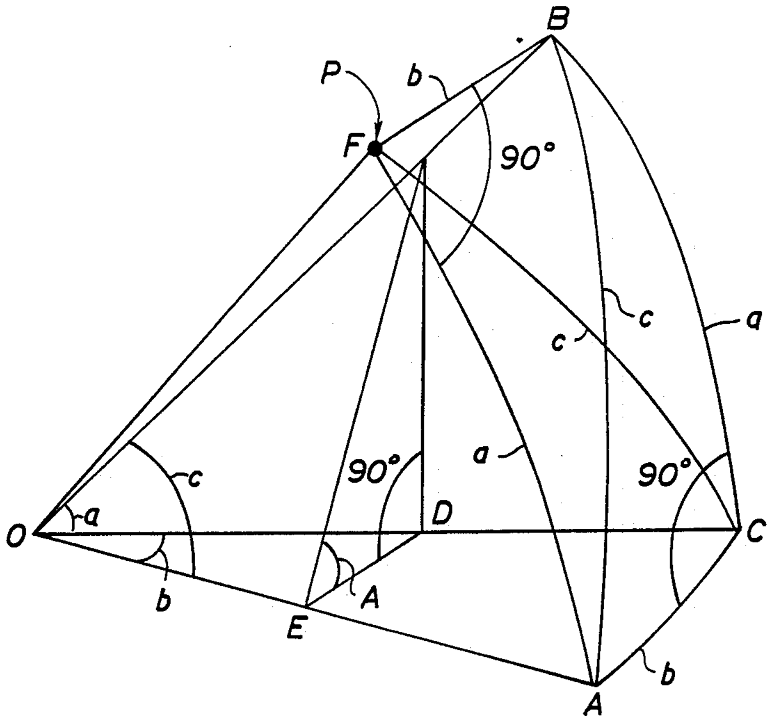
FIG. 6 spherical surface which represents the excursions of a pivotal mass.
Figure 8:
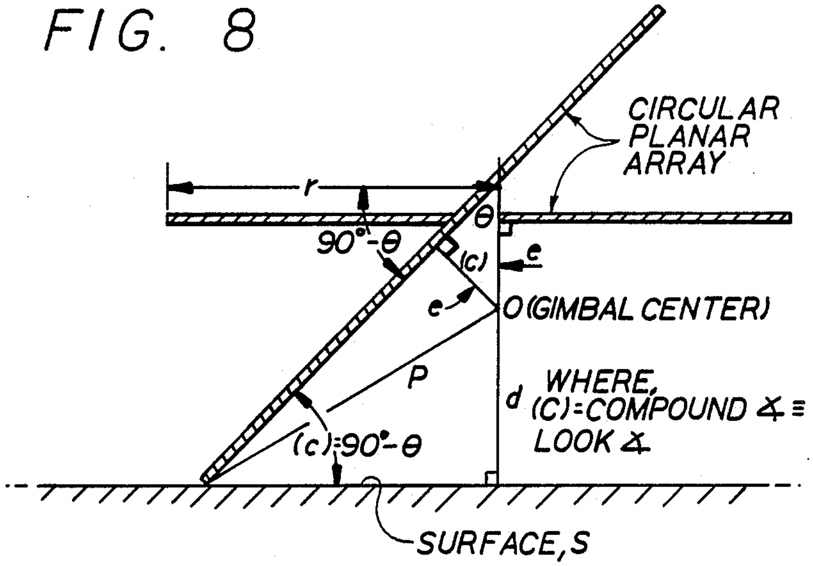
FIG. 8 is a schematic representation of the pivotally supported antenna of the present invention.
Figures 7A, 7B:
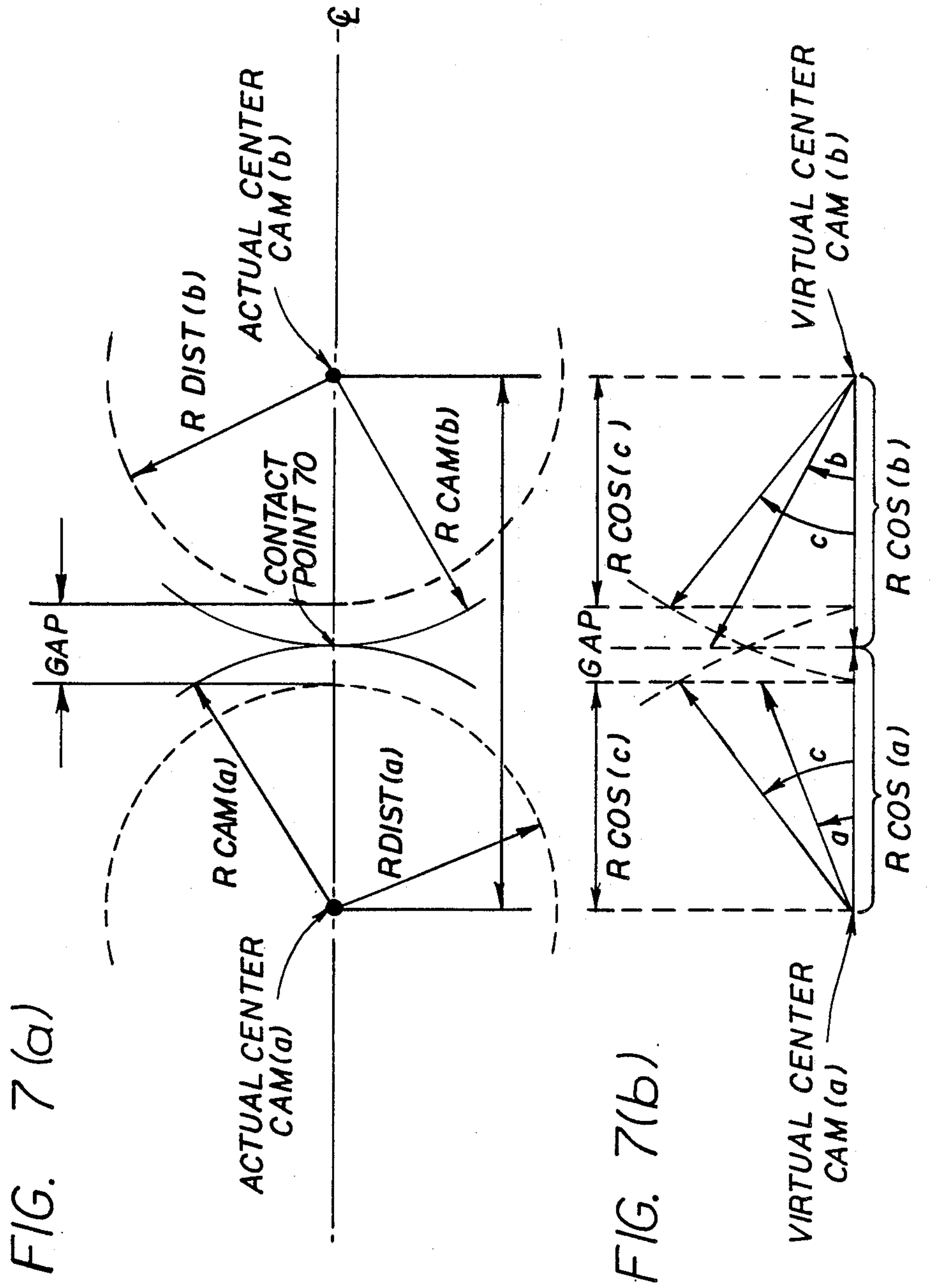
FIGS. 7 (*a*) and 7(*b*) represent the geometries of the cams of the present invention.

For the dual cam drive assembly of the present invention with a restricting envelope of motion, the cam profiles may be generated which sum mechanically the cam rotations and relate them to the restrictive compound angle. FIGS. 6–8 facilitate the disclosure of a technique for designing the profiles of the contact surfaces of the cams 12 and 14. FIG. 6 is a right spherical triangle from *Plane and Spherical Trigonometry* by Rosenbach, Whitman and Moskouite, pp. 292, 293, modified as discussed below. It is shown by Rosenbach et al that for the compound angle 'c':

$$\cos(c)=\cos(a)\cos(b) \quad [1].$$

Alternatively, $$b=\arccos(\cos(c)/\cos(a)) \quad [2]$$

As shown in FIGS. 7(*a*) and 7(*b*), the cam profile varies within a radial distance which shall be referred to as the gap. This gap shall be equal to the sum of the rises of the two cams 12 and 14 when the cams are in profile contact. The rise of the first cam 12 along the line of cam centers, is Rcos(a), similarly, the rise of the second cam 14 is Rcos(b), where R is a function of the angle. See FIG. 7(*b*). (Note that the contact point 70 is transient and moves through the gap span along the line joining cam centers, as the cams 12 and 14 rotate through companion angle's 'a' and 'b' to produce a continuous, limited compound angle.) Since the angles 'a' and 'b' cannot exceed the magnitude of the compound angle 'c', the amount of actual rise of the first cam 12 is:

$$R\cos(a)-R\cos(c) \quad [3]$$

and the rise of the second cam 14 is:

$$R\cos(b)-R\cos(c). \quad [4]$$

The sum of the two rises equals the gap:

$$GAP=R\cos(a)-R\cos(c)+R\cos(b)-R\cos(c) \quad [5]$$

15 or $$GAP=R(\cos(a)+\cos(b)-2\cos(c)) \quad [6]$$

Substituting for cos(b) from equation [2], $$GAP=R(\cos(a)+\cos(c)/\cos(a)-2\cos(c))$$

solving for R, $$R=GAP/(\cos(a)+\cos(c)/\cos(a)-2\cos(c)) \quad [7]$$

Substituting equation [7]into equations [3]and [4]produces the equations defining the profiles for cams 12 and 14. Thus, for cam 12, $$RCAM\text{-}12=(GAP/(\cos(a)+\cos(c)/\cos(a)-2\cos(c)))\times(\cos(a)-\cos(c)) \quad [8]$$

while for cam 14, $$R_{CAM-14}=(GAP/(\cos(b)+\cos(c)/\cos(b)-2\cos(c)))\times(\cos(b)-\cos(c)) \quad [9]$$

Thus, with equations [8]and [9]the cam profiles may be calculated directly or graphically for a range of input angles.

To the cam profile may be added any fixed radial distance $R_{DIST-12}$ required to produce a practical cam. Thus, the practical cam equations are:

$$R_{CAM-12}=GAP/(\cos(a)+\cos(c)/\cos(a)-2\cos(c)))\times(\cos(a)-\cos(c))+R_{DIST\text{-}12} \quad [10]$$

and $$R_{CAM-14}=(GAP/(\cos(a)+\cos(c)/\cos(a)-2\cos(c)))\times(\cos(b)-\cos(c))+R_{DIST-14}\times \quad [11]$$

The fixed radial distance for the first cam 12 may be different from the second cam 14 so long as:

$$R_{DIST-12}+R_{DIST-14}+GAP=D \quad [12]$$

where D is the distance between the cam centers.

When such a two axis system is defined as in FIG. 8 (apex at o), angle 'c' may be calculated as:

$$c=\arcsin(d/p)+\arcsin(e/p) \quad [13]$$

where $p=(r^2+e^2)^{\frac{1}{2}}$. Substituting for 'b' in equation [2]produces:

$$b=\arccos[\cos(\arcsin(d/p)+\arcsin(e/p)/\cos(a)] \quad [14]$$

indicating that for the system of FIG. 8, an input angle 'a' determines the angle 'b', (in an orthogonal axis) such that the compound angle 'c' results when r intersects the plane of the surface s. As discussed above, equation [14]can be scaled to fit a cam surface such that the first and second cams 12 and 14 contact when the compound angle is selected to prevent the edge of the mass from striking the surface, s.

Thus, the present invention has been described herein with reference to an illustrative embodiment for an illustrative application. Those of ordinary skill in the art and access to the teachings provided herein will recognize additional modifications, applications, and embodiments within the scope of the invention. For example, the teachings of the present invention can generalized for any shape mass being pivoted. Instead of a device with a constant radius r, f(angle) may be substituted. In addition, the surface being intersected may vary. Instead of a constant compound angle 'c' (which is generated by the intersection of a disc with a plane), equation [1]above would use cos(f(x,y,z)), representing a varying angle of intersection indicating an irregular topography being intersected.

Thus, it is intended by the appended Claims to cover any and all such modifications, applications, and embodiments.

Accordingly, what is claimed is:

1. A compound angle limiting device for limiting the movement of a mass within first and second prescribed angular ranges about first and second axes respectively comprising:
   - first means mechanically coupled to said mass for sensing movement of said mass about said first axis;
   - second means mechanically coupled to said mass for sensing movement of said mass about said second axis;
   - a first cam mechanically coupled to said first means and movable in response to thereto; and
   - a second cam mechanically coupled to said second means and movable in response thereto;

said first and second cams mounted for physical contact at at least one point to limit the compound angular excursion of said mass via said first and second means.

2. The compound angle limiting device of claim 1 wherein said first means is a first gear.

3. The compound angle limiting device of claim 2 wherein said second means is a second gear.

4. The compound angle limiting device of claim 1 including means for indirectly coupling said first means to said first cam.

5. The compound angle limiting device of claim 4 including means for indirectly coupling said second means to said second cam.

6. The compound angle limiting device of claim 5 wherein said means for indirectly coupling said first means to said first cam and said means for indirectly coupling said second means to said second cam include first and second translation gears to which said first and second cams are attached respectively, said first and second translation gears adapted to engage said first and second means respectively.

7. The compound angle limiting device of claim 5 including first and second translation gears attached to said first and second cams and adapted to engage said first and second gears respectively.

8. The compound angle limiting device of claim 1 including cam following means for destabilizing said first and second cams.

9. The compound angle limiting device of claim 3 including cam following means for destabilizing said first and second cams.

10. The compound angle limiting device of claim 6 including cam following means for destabilizing said first and second cams.

11. The compound angle limiting device of claim 7 including cam following means for destabilizing said first and second cams.

12. The compound angle limiting device of claim 11 wherein said cam following means includes an exposed bearing mounting within an arm pivotally mounted between said first and second cams.

13. A compound angle limiting device for limiting the movement of a mass within first and second prescribed angular ranges about first and second axes respectively comprising:

first means mechanically coupled to said mass for sensing movement of said mass about said first axis, said first means including a first gear;

second means mechanically coupled to said mass for sensing movement of said mass about said second axis, said second means including a second gear;

a first cam indirectly coupled to said first means and movable in response to thereto; and a second cam indirectly coupled to said second means and movable in response thereto;

said first and second cams mounted for physical contact at at least one point to limit the compound angular excursion of said mass via said first and second means.

14. A compound angle limiting device for limiting the movement of a mass within first and second prescribed angular ranges about first and second axes respectively comprising:

first means mechanically coupled to said mass for sensing movement of said mass about said first axis, said first means including a first gear;

second means mechanically coupled to said mass for sensing movement of said mass about said second axis, said second means including a second gear;

a first cam mechanically coupled to said first means and movable in response to thereto;

a second cam mechanically coupled to said second means and movable in response thereto;

said first and second cams mounted for physical contact at at least one point to limit the compound angular excursion of said mass via said first and second means; and cam following means for destabilizing said first and second cams.

15. A compound angle limiting device for limiting the movement of a mass within first and second prescribed angular ranges about first and second axes respectively comprising:

first means mechanically coupled to said mass for sensing movement of said mass about said first axis, said first means including a first gear;

second means mechanically coupled to said mass for sensing movement of said mass about said second axis, said second means including a second gear;

a first cam indirectly coupled to said first means and movable in response to thereto;

a second cam indirectly coupled to said second means and movable in response thereto;

said first and second cams mounted for physical contact with at least one point to limit the compound angular excursion of said mass via said first and second means; and cam following means for destabilizing said first and second cams.

16. An improved method for controlling the angular excursions of a pivoted mass within first and second prescribed angular ranges about first and second axes respectively including the steps of:

a) sensing movement of said mass about said first axis;

b) sensing movement of said mass about said second axis;

c) coupling a first cam to said first means whereby said first cam is movable in response to thereto; and d) coupling a second cam to said second means whereby said second cam is movable in response thereto;

e) mounting said first and second cams for physical contact with at least one point to limit the compound angular excursion of said mass via said first and second means.

17. The method of claim 16 including the step of destabilizing said first and second cams.

18. A method for controlling angular excursions of a mass pivotally supported relative to a frame within a compound angle by mounting a device in the pivotal support between said mass and said frame which limits the compound angular excursions of said mass relative to said frame, wherein said device includes:

first means for sensing movement of said mass about a first axis;

second means for sensing movement of said mass about a second axis;

a first cam mechanically coupled to said first means and movable in response thereto; and a second cam mechanically coupled to said second means and movable in response thereto;

said first and second cams mounted for physical contact with at least one point to limit the compound angular excursion of said mass via said first and second means.

19. A method for controlling angular excursions of a mass pivotally supported relative to a frame within a compound angle by mounting a device in the pivotal support between said mass and said frame which limits the compound angular excursions of said mass relative to said frame, wherein said device includes:

first means for sensing movement of said mass about a first axis;

second means for sensing movement of said mass about a second axis;

a first cam indirectly coupled to said first means and movable in response thereto;

a second cam indirectly coupled to said second means and movable in response thereto;

said first and second cams mounted for physical contact with at least one point to limit the compound angular excursion of said mass via said first and second means; and cam following means for destabilizing said first and second cams.

* * * * *